US009891010B2

(12) United States Patent
Chyou et al.

(10) Patent No.: US 9,891,010 B2
(45) Date of Patent: Feb. 13, 2018

(54) WASTE HEAT RECOVERY APPARATUS HAVING HOLLOW SCREW SHAFT AND METHOD FOR THE SAME

(71) Applicant: Institute of Nuclear Energy Research, Atomic Energy Council, Executive Yuan, R.O.C., Taoyuan, TX (US)

(72) Inventors: Yau-Pin Chyou, Taipei (TW); Yi-Shun Chen, Taoyuan (TW); Shu-Che Li, Taoyuan (TW); Jhe-Yu Lin, Taoyuan (TW); Hung-Te Hsu, Taoyuan (TW)

(73) Assignee: INSTITUTE OF NUCLEAR ENERGY RESEARCH, ATOMIC ENERGY COUNCIL, EXECUTIVE YUAN, R.O.C., Taoyuan (TW)

( * ) Notice: Subject to any disclaimer, the term of this patent is extended or adjusted under 35 U.S.C. 154(b) by 229 days.

(21) Appl. No.: 14/827,061

(22) Filed: Aug. 14, 2015

(65) Prior Publication Data
US 2016/0045946 A1  Feb. 18, 2016

(30) Foreign Application Priority Data
Aug. 15, 2014 (TW) .............................. 103128131 A

(51) Int. Cl.
F28F 7/00 (2006.01)
F28F 13/00 (2006.01)
(Continued)

(52) U.S. Cl.
CPC .................. *F28F 5/06* (2013.01); *B09B 3/00* (2013.01); *B09B 5/00* (2013.01); *F01K 17/005* (2013.01);
(Continued)

(58) Field of Classification Search
CPC ......................................................... F28F 5/06
(Continued)

(56) References Cited

U.S. PATENT DOCUMENTS 2,095,540 A * 10/1937 Blood .................. H01T 13/467
123/169 EL
2,610,033 A * 9/1952 Rietz ...................... F28D 11/02
165/87
(Continued)

FOREIGN PATENT DOCUMENTS

CN       203127646 U  *  8/2013
DE   102009015515 A1  * 10/2010  ............. F24D 17/02
(Continued)

*Primary Examiner* — Laert Dounis
(74) *Attorney, Agent, or Firm* — Locke Lord LLP; Tim Tingkang Xia, Esq.

(57) ABSTRACT

A waste heat recovery apparatus includes a waste processing module and a heat recovery module. The waste processing module includes a heat exchange unit and a drive unit. The heat exchange unit includes a hollow tubular structure having at least one material inlet, at least one material outlet and a screw mounted axially thereinside. The drive unit rotates the screw to extrude the waste material. The heat recovery module includes a heat storage unit, at least one conveying pipeline and a compression unit. The heat storage unit contains a heat-storing medium for storing thermal energy. The conveying pipeline connected to the heat exchange unit and the heat storage unit allows a working medium to flow through the heat exchange unit and the heat storage unit. The compression unit coupled to the conveying pipeline circulates the working medium to flow in the conveying pipeline.

15 Claims, 11 Drawing Sheets

(51) Int. Cl.
  *F28F 5/06* (2006.01)
  *F01K 17/00* (2006.01)
  *B09B 3/00* (2006.01)
  *F28D 20/00* (2006.01)
  *F28D 21/00* (2006.01)
  *B09B 5/00* (2006.01)
  *F01K 15/00* (2006.01)

(52) U.S. Cl.
  CPC ......... *F28D 20/00* (2013.01); *F28D 21/0001* (2013.01); *F28F 13/00* (2013.01); *F01K 15/00* (2013.01); *Y02E 60/142* (2013.01); *Y02W 30/20* (2015.05)

(58) Field of Classification Search
  USPC ............. 165/87, 89, 90, DIG. 226, DIG. 229
  See application file for complete search history.

(56) References Cited

U.S. PATENT DOCUMENTS

| | | | | |
|---|---|---|---|---|
| 2,617,273 A * | 11/1952 | Findlay | ............... | B01D 9/0013 165/65 |
| 3,890,685 A * | 6/1975 | Runte | ..................... | B23P 15/26 165/87 |
| 4,313,785 A * | 2/1982 | Schellstede | ............ | B01D 1/226 159/13.2 |
| 4,639,217 A * | 1/1987 | Adams | ..................... | F27B 7/04 110/226 |
| 5,216,821 A * | 6/1993 | McCabe | .................. | B01J 19/20 34/180 |
| 5,681,256 A * | 10/1997 | Nagafuji | .................... | H02P 5/50 494/84 |
| 2010/0112242 A1* | 5/2010 | Medoff | ..................... | C08H 8/00 428/22 |
| 2011/0209475 A1* | 9/2011 | Jeter | .......................... | F24J 2/07 60/641.11 |
| 2012/0132398 A1* | 5/2012 | Jeter | ...................... | F28D 11/02 165/104.15 |

FOREIGN PATENT DOCUMENTS

| | | | | |
|---|---|---|---|---|
| DE | 102010006841 A1 * | 8/2011 | ............. | C02F 1/006 |
| JP | 3687155 B2 * | 8/2005 | ................ | F28F 5/06 |

\* cited by examiner

WASTE HEAT RECOVERY APPARATUS HAVING HOLLOW SCREW SHAFT AND METHOD FOR THE SAME

CROSS-REFERENCE TO RELATED APPLICATIONS

This application claims the benefit of Taiwan Patent Application Serial No. 103128131, filed Aug. 15, 2014, the subject matter of which is incorporated herein by reference.

BACKGROUND OF INVENTION

1. Field of the Invention

The invention relates to a waste heat recovery apparatus and a method for the same, and more particularly to the apparatus and the method for recovering thermal energy through a heat exchange process performed when a screw-extruded waste material with a high thermal value is transported.

2. Description of the Prior Art

Recently, owing to the rising awareness of environmental protection, discussion upon improvement of energy efficiency has been attracting people's attention. Related researches and energy storage apparatuses become the mainstream in both academia and industry. In particular, the recycling of waste heat is one of the popular and interesting topics.

It is aware in the art that high-temperature waste materials are usually seen in a metal-processing factory, a granular moving-bed, a heat treatment plant, or any facility the like. The high-temperature waste material usually has a temperature ranging from 100 to 600° C. or above. Conventionally, the high-temperature waste materials are usually discarded or buried directly, from which the thermal energy contained in these waste material would be dissipated into the atmosphere. Such a situation implies that the valuable thermal energy can't be recovered any more, and also definitely be a setback in energy recycling and economic development.

SUMMARY OF THE INVENTION

Accordingly, a primary object of the present invention is to provide a waste heat recovery apparatus and a method for the same, in which a high-efficiency heat exchange process is performed between a high-temperature waste material and a comparatively low-temperature working medium through a waste processing module so as to achieve a purpose of recovering the thermal energy of the waste material. Further, a heat recovery module having a heat storage unit is arranged to provide a recycling environment in which the working medium with a high thermal value passing therethrough can perform a cycling heat-discharging and heat-absorbing processes to generate thermal energy that can be stored in the heat storage unit for further utilization. Since the working medium can be continuously circulated between the heat-absorbing process in the waste processing module and heat-discharging process in the heat recovery module, a purpose of increasing the heat recovery efficiency with a lower cost can thus be obtained.

In one embodiment, the waste heat recovery apparatus comprises a waste processing module and a heat recovery module. The waste processing module further comprises a heat exchange unit and a drive unit. The heat exchange unit includes a housing formed as a hollow tubular structure having two opening ends, in which a hollow portion thereof is defined as a first material chamber. The hollow tubular structure further includes at least one material inlet arranged exteriorly at a peripheral wall of the hollow tubular structure for providing the waste material entering the hollow tubular structure, and at least one material outlet arranged exteriorly at the peripheral wall of the hollow tubular structure and spaced away from the at least one material inlet for providing the waste material exhausting from the hollow tubular structure. Also, at least one screw is arranged axially inside the hollow tubular structure, and has two opposing ends extend outwardly from the ends of the housing. The drive unit located exteriorly of the heat exchange unit rotates the screw whereby the waste material can be forced to move forward. The heat recovery module arranged externally of the waste processing module further comprises a heat storage unit, at least one conveying pipeline and a compression unit. The heat storage unit has a heat storing medium arranged therein for storing the thermal energy. The heat exchange unit and the heat storage unit are communicated with the conveying pipeline through which a working medium can circulate between the heat exchange unit and the heat storage unit. The compression unit is coupled to the conveying pipeline for driving the working medium flowing through the conveying pipeline.

All these objects are achieved by the waste heat recovery apparatus and a method for the same described below.

BRIEF DESCRIPTION OF THE DRAWINGS

The present invention will now be specified with reference to its preferred embodiment illustrated in the drawings, in which.

DESCRIPTION OF THE PREFERRED EMBODIMENT

The invention disclosed herein is directed to a waste heat recovery apparatus and a method for the same. In the following description, numerous details are set forth in order to provide a thorough understanding of the present invention. It will be appreciated by one skilled in the art that variations of these specific details are possible while still achieving the results of the present invention. In other instance, well-known components are not described in detail in order not to unnecessarily obscure the present invention.

Figure 1:
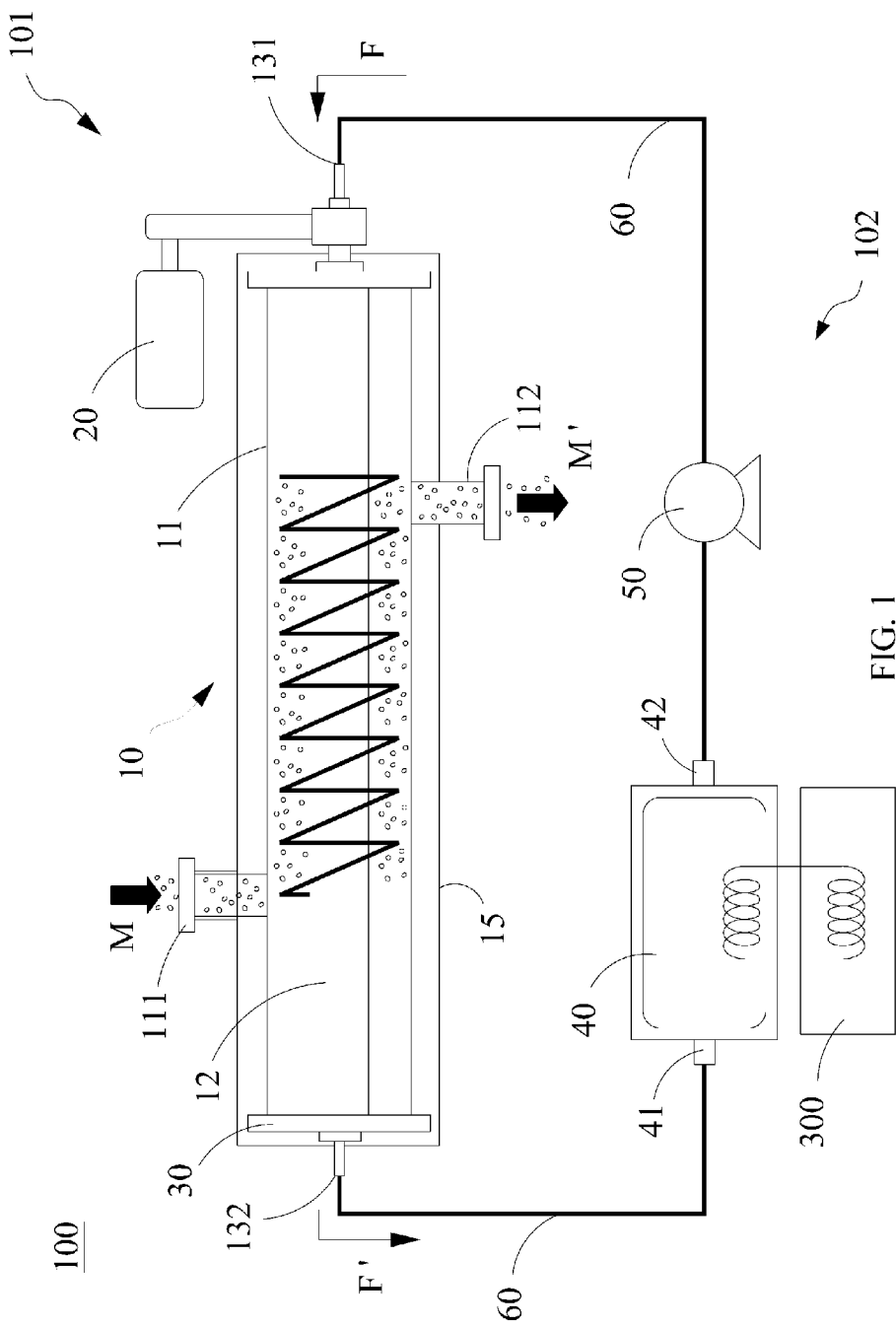
FIG. 1 is a schematic view of the waste heat recovery apparatus in accordance with the present invention.
Figure 2:
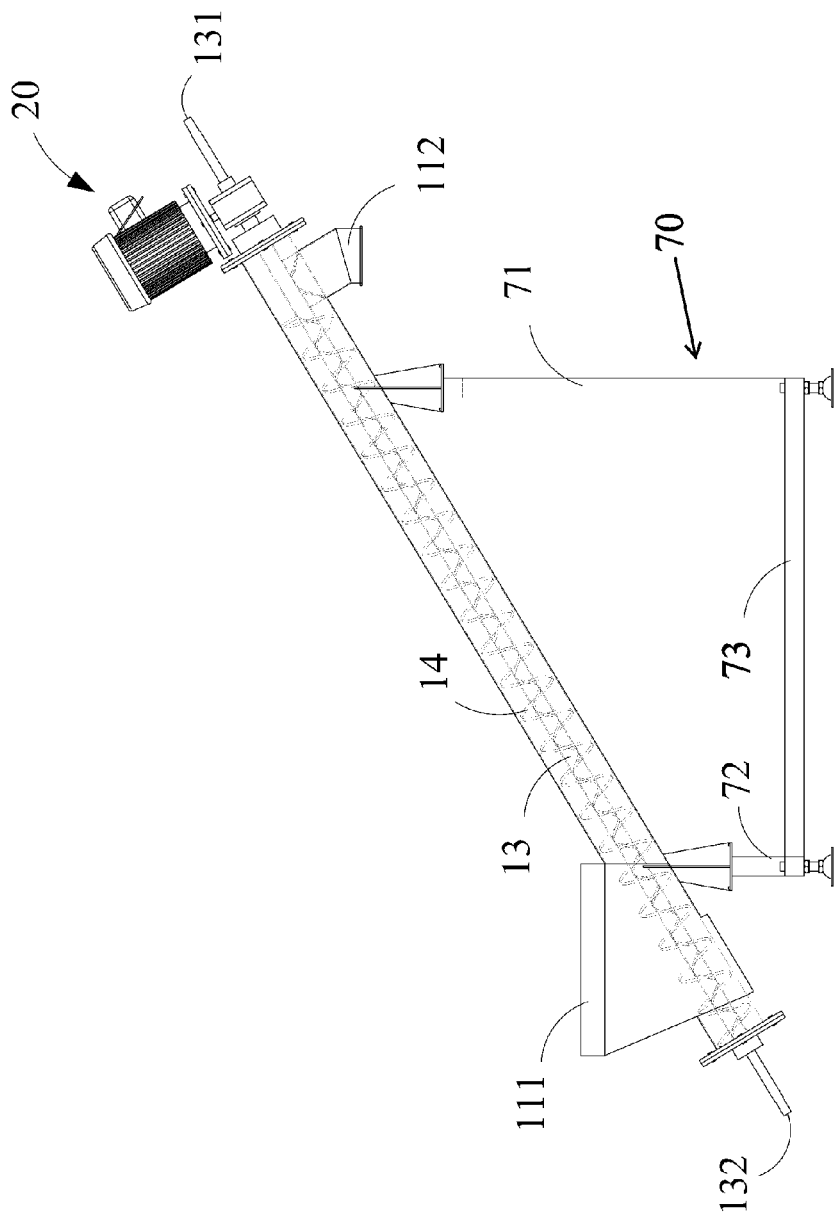
FIG. 2 is a schematic view of the waste processing module in accordance with the present invention.

Referring now to FIG. 1 an FIG. 2, the waste heat recovery apparatus 100 of the present invention comprises a waste processing module 101 and a heat recovery module 102.

The waste processing module 101 further comprises a heat exchange unit 10, a drive unit 20, a pipe connector assembly 30 and an elevation-adjusting assembly 70.

The heat exchange unit 10 further includes a housing, at least one screw 12 and a heat-insulation cover 15.

The housing formed as a hollow tubular structure 11 has two opening ends. The hollow tubular structure 11 can be shaped as a hollow cylindrical pipe, a hollow conical pipe, or a combination of the aforesaid two pipes. The peripheral wall of the hollow tubular structure 11 further has at least one material inlet 111 and at least one material outlet 112 mounted and communicated therewith, respectively. In the present embodiment, the at least one material inlet 111 is arranged close to the one end of the hollow tubular structure 11 whereas the at least one material outlet 112 is arranged close to the other end of the hollow tubular structure 11. It is noted that the location for arranging the material inlet 111 and material outlet 112 is not limited to the present disclose but instead can be determined according to user's need. One end of the material inlet 111 or the material outlet 112 is communicated with the atmosphere. In one embodiment, the material for the hollow tubular structure 11 can include, but is not limited to, SUS304 stainless steel, SUS310 stainless steel, SUS316 stainless steel and Inconel. In addition, the opening diameter, position arrangement, as well as the quantities of the material inlet 111 or the material outlet 112 are not limited to the present described embodiment but instead may be variously embodied according to the actual needs.

The screw 12 is axially arranged along the center line inside the hollow tubular structure 11 and has two opposing ends extending outward from the respective ends of the hollow tubular structure 11. The screw 12 is an assembly having a screw shaft 13 and a helical blade 14 formed on the outer surface of the screw shaft 13. The screw 12 can be, but is not limited to, a single-threaded screw, a double-threaded screw, or a multi-threaded screw, each of which may have a rectangular or triangular cross section. Alternatively, the screw 12 is a ball screw that may also be, but is not limited to, a single-threaded screw, a double-threaded screw, or a multi-threaded screw. It is noted that the relevant lead and pitch of the screw 12 can be variously embodied according to the actual needs.

In the present embodiment, the screw shaft 13 is a hollow shaft having both opposing ends extending outside of the hollow tubular structure 11 wherein the one end has at least one first opening 131 and the other end has at least one second opening 132. The wall thickness of the hollow screw shaft 13 is determined according to the bearing torque under the various operation speed as well as types of the screw 12, so there has no specific limitation on the thickness design of the screw shaft 13.

The helical blade 14 is extended exteriorly from the outer surface of screw shaft 13 in a winding and spiral manner such that the screw shaft 13 is arranged in the center of the helical blade 14. It is noted that a pitch size of the helical blade 14 is determined according to the formation of the waste material M and it can be adjusted by replacing with another screw having different pitch size thereby preventing the material clogging during the transportation of material. The pitch size is ranged from 0.5 in to 5.5 in. Preferably, it can be, but is not limited to, 1, 1.25, 1.5, 1.75, 2, 2.25, 2.5, 2.75 or 3-5 inches.

Figure 3:
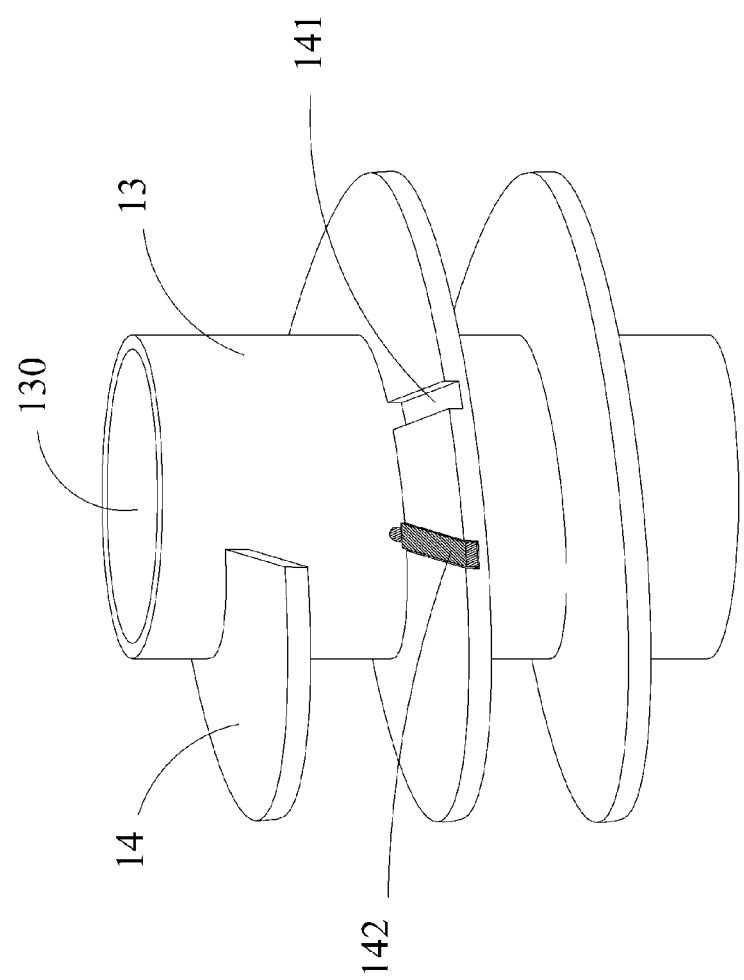
FIG. 3 is a schematic perspective view of a portion of the screw in accordance with the present invention.
Figure 4:
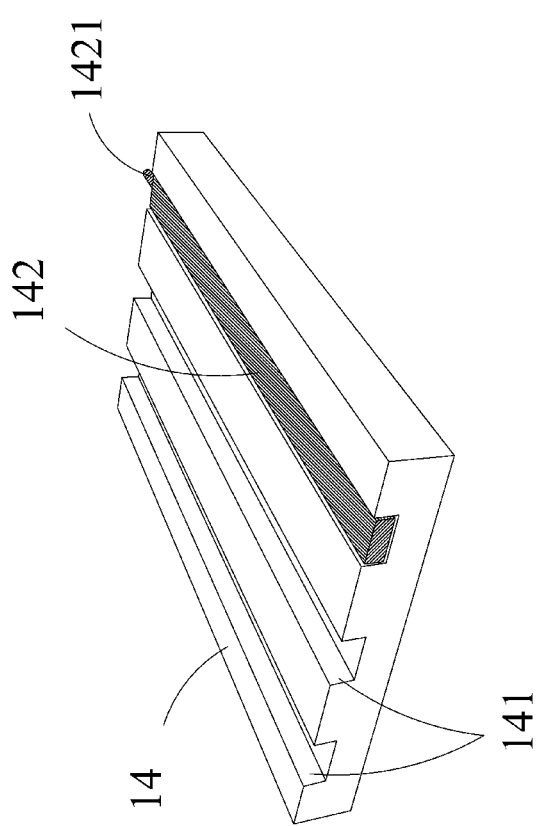
FIG. 4 is a schematic perspective view of a portion of the helical blade in accordance with the present invention.

Referring now to FIG. 3 an FIG. 4, the helical blade 14 further has a plurality of radial grooves 141 formed on the same surface or different surface of the helical blade 14, wherein, in one embodiment, the length of each groove is the same as the width of the surface of the helical blade 14 and an interval between two adjacent radial grooves is the same as or different from each other. In addition, the cross section of the groove 141 can be, but is not limited to, a concave shape, a U shape, a V shape, a round shape or any the like. Each groove 141 is further adapted to accommodate a heat-conductive block 142 having a cross-sectional profile fitting into the cross-sectional profile of the corresponding grove 141. As shown in FIG. 3 and FIG. 4, the heat-conductive block 142 is formed to be, but is not limited to, a long block or any shape that meets the design requirement. Each heat-conductive block 142 further has one end formed as a heat-conductive stud 1421 having a cross-sectional profile selected from a rectangle, a diamond shape, a circle, an oval shape, or an O shape and extending to penetrate through the screw shaft 13 so that a portion of the heat-conductive stud 1421 is protruded into the hollow space of the screw shaft 13 whereby the heat-conductive block 142 can be secured in the respective groove 141. In the present invention, the heat-conductive block 142 and the heat-conductive stud 1421 can be made of the same or different materials having high thermal conductivity coefficients. For example, the material can be metal material, a carbon-metal composite material, alloy composed of two or more metal material or a metal and non-metal material, wherein the aforesaid metal material can be, but is not limited to, Pb, Ni, Fe, steel, Pt, Zn, Mo, Mg, W, Cu, Al, Au, Ag and so on. In addition, the material can also be formed by non-metal material such as diamond, graphene or the like. In this embodiment, the heat-conductive block 142 and the heat-conductive stud 1421 are both made of the same Cu material.

It is noted that there has no specific limitation on the length of protrusive portion of the heat-conductive stud 1421 within the hollow space of the screw shaft 13 and cross-sectional dimension such as thickness or diameter thereof, each of which can be determined and optimized according to the area of thermal conduction surface and the fluid characteristics of the working medium F.

Further, according to the heat transfer theory in the fin design, an optimized heat transfer between the heat-conductive block 142 and the whole system can be achieved by many times of simulations and testing such that the thermal energy of the heat waste M can be efficiently absorbed by the heat-conductive block 142. Since the heat dissipation rate is proportional to the temperature gradient between the heat-conductive block 142 and the surrounding environment, a highly increased temperature at the end portion of the heat-conductive block 142 would greatly reduce the heat dissipation efficiency. Accordingly, the design with respect to the heat dissipation efficiency can be expressed by the following equation:

$$\eta = \frac{\tanh \times mL}{mL},$$

wherein m is expressed as $$\sqrt{\frac{2\ hz}{ktz}}.$$

If L/t (length to thickness ratio of the protruded portion, e.g., heat-conductive studs 1421, of the heat-conductive block 142) >>1, then m can be expressed as $$\sqrt{\frac{2\ h}{kt}}.$$

According to the aforesaid equation, the optimized design of the heat-conductive block 142 can also be referred to the following equation:

$$\frac{Q(\text{with fin})}{Q(\text{without fin})} = \frac{\tanh \times mL}{\sqrt{\frac{hA}{kP}}},$$

wherein the L stands for the protruded length (m) of the heat-conductive block 142, the k stands for the heat transfer coefficient (W/m° C.) of the heat-conductive block 142, the h stands for the thermal convection coefficient (W/m2° C.), the t stands for the thickness of the heat-conductive block 142, the A stands for the cross-sectional area of the screw 12 without the heat-conductive block 142, and the P stands for the circumference of the A.

Figure 5:
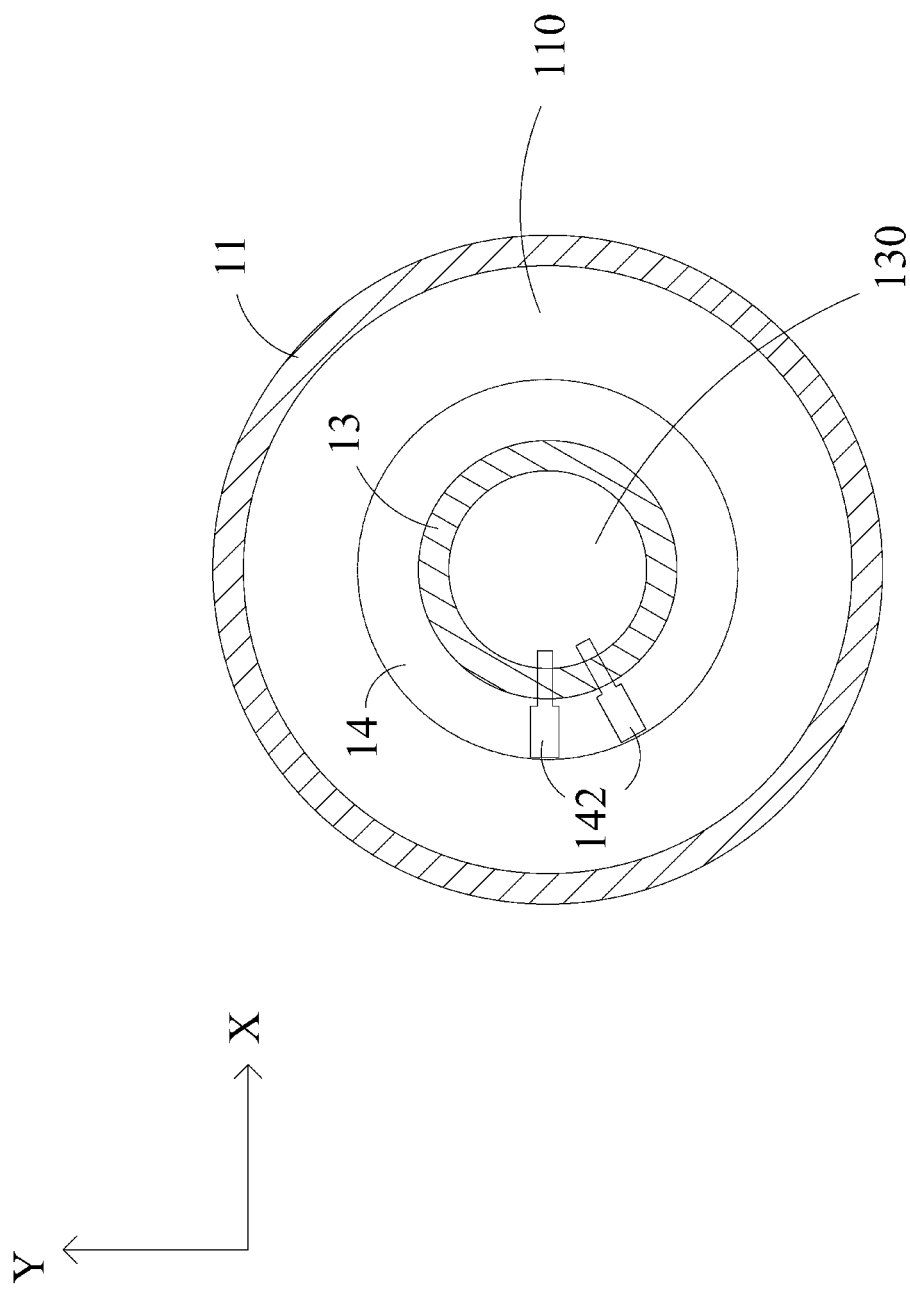
FIG. 5 is a schematic cross-sectional view of a portion of an embodiment of the heat exchange unit in accordance with the present invention.

Referring now to FIG. 1 and FIG. 5, a first material chamber 110 is formed between the hollow tubular structure 11 and the screw 12. The first material chamber 110 is communicated with both the material inlet 111 and the material outlet 112. The hollow space within the screw shaft 13 is defined as a second material chamber 130 communicated with the first opening 131, and the second opening 132.

Further, in this embodiment, the cross-sectional area of the first material chamber 110 at any portion along the longitudinal direction of the hollow tubular structure 11 is substantially the same. It is noted that the design of the cross-sectional area is not limited to the foregoing embodiment; for example, alternatively, the hollow tubular structure 11 may be formed by integrating different sections respectively having different cross-sectional area, so that the cross-sectional area of the first material chamber 110 may be varied along the longitudinal direction of the hollow tubular structure 11.

Referring now to FIG. 1 and FIG. 2, the heat-insulation cover 15 is adapted to wrap around the hollow tubular structure 11, the pipe connector assembly 30 and the protrusive portions of the screw shaft 13 exposed out of the hollow tubular structure 11. For example, the heat-insulation cover 15 can be made of insulation material including, but not limited to, a high temperature resistant foam, a polymer, a refractory ceramic fiber, the asbestos, and a glass fiber. The heat-insulation cover 15 can prevent the thermal energy from being dissipated to the atmosphere while a heat exchange process is performed.

The pipe connector assembly 30 formed by a metal or alloy plate can be connect to the respective end of the hollow tubular structure 11 by selectively using a permanently sealed way or a detachably secured way through screws. The pipe connector assembly 30 further has a supporting base for supporting the screw 12.

The drive unit 20 located exteriorly at one end (the top end in FIG. 2) of the hollow tubular structure 11 comprises a motor and a bearing assembly, in which the bearing assembly is coupled with the screw shaft 13 whereby the motor can rotate the shaft 13 through a control system. In this embodiment, the motor can be, but is not limited to, a step motor or a servo motor, which is selectively utilized according to a requirement of the torque and the revolution rate depending on the compositions of the waste material. Preferably, the control system can further control the speed and the rotating direction of the motor.

The elevation-adjustable assembly 70 includes a base 73, a first support member 71 and a second support member 72. The lower ends of the first support member 71 and the second support member 72 can be selectively in a permanently fixed manner or in a detachable manner to the base 73, while the upper ends of the first support member 71 and the second support member 72 are respectively coupled with the respective ends of the hollow tubular structure 11. In one embodiment of the present invention, the first support member 71 is longer and thus higher than the second support member 72 so that the hollow tubular structure 11 is arranged in a tilted manner. Specifically, the lengths of the first support member 71 and the second support member 72 can be separately adjusted so as to dispose the hollow tubular structure 11 at various declinations or slopes.

The heat recovery module 102 includes a heat storage unit 40, a conveying pipeline 60, a compression unit 50 and at least one energy output apparatus 300.

The heat storage unit 40 is formed as a container or a tank having a first connection channel 41 and a second connection channel 42. The first connection channel 41 and the second connection channel 42 are pipes that can provide the heat storage unit 40 to communicate with exterior. The peripheral wall of the heat storage unit 40 can also be wrapped by the aforesaid heat-insulation cover 15. The heat storage unit 40 contains thereinside a heat-storing medium for absorbing and thereafter storing the thermal energy. In the present invention, the heat-storing medium can be, but is not limited to, one of a steam, a molten salt, a heat-conductive oil, a metallic material and a ceramic material, which is actually determined according to the heat exchange efficiency of heat storage unit 40.

The conveying pipeline 60 is divided into two sections including a front section and a tail section. One end of the front section of the conveying pipeline 60 is connected with the second opening 132, while the other end thereof is connected with the first connection channel 41 of the heat storage unit 40. On the other hand, one end of the tail section of the conveying pipeline 60 is connected with the second connection channel 42 of the heat storage unit 40, while the other end thereof is connected with the first opening 131.

The energy output apparatus 300 is coupled with the heat storage unit 40. The thermal energy absorbed by the heat-storing medium inside the heat storage unit 40 can be transferred to the energy output apparatus 300 by thermal conduction or thermal convection. Then, the energy output apparatus 300 can use the thermal energy directly, or alternatively, can further convert the thermal energy into other form of energy and output the converted thermal energy for some further purposes of usage. For example, the energy output apparatus 300 can be a hot water supply apparatus, a generator, a warm-air providing apparatus, a steam generator, a burning apparatus, or any the like.

The compression unit 50 can be located anywhere in the front or tail section of the conveying pipeline 60. Alternatively, the compression unit 50 can be coupled between the heat storage unit 40 and the first opening 131 (as shown in FIG. 1), or the compression unit 50 can be coupled between the heat storage unit 40 and the second opening 132. The compression unit 50 can be, but is not limited to, one of a volumetric pump, a positive-displacement pump, a power type pump, an electromagnetic pump, or any pump the like. The determination of the type of the pump depends mainly on the waste material to be processed by the heat recovery apparatus 100 and the working medium F used for heat conveying.

Figure 6:
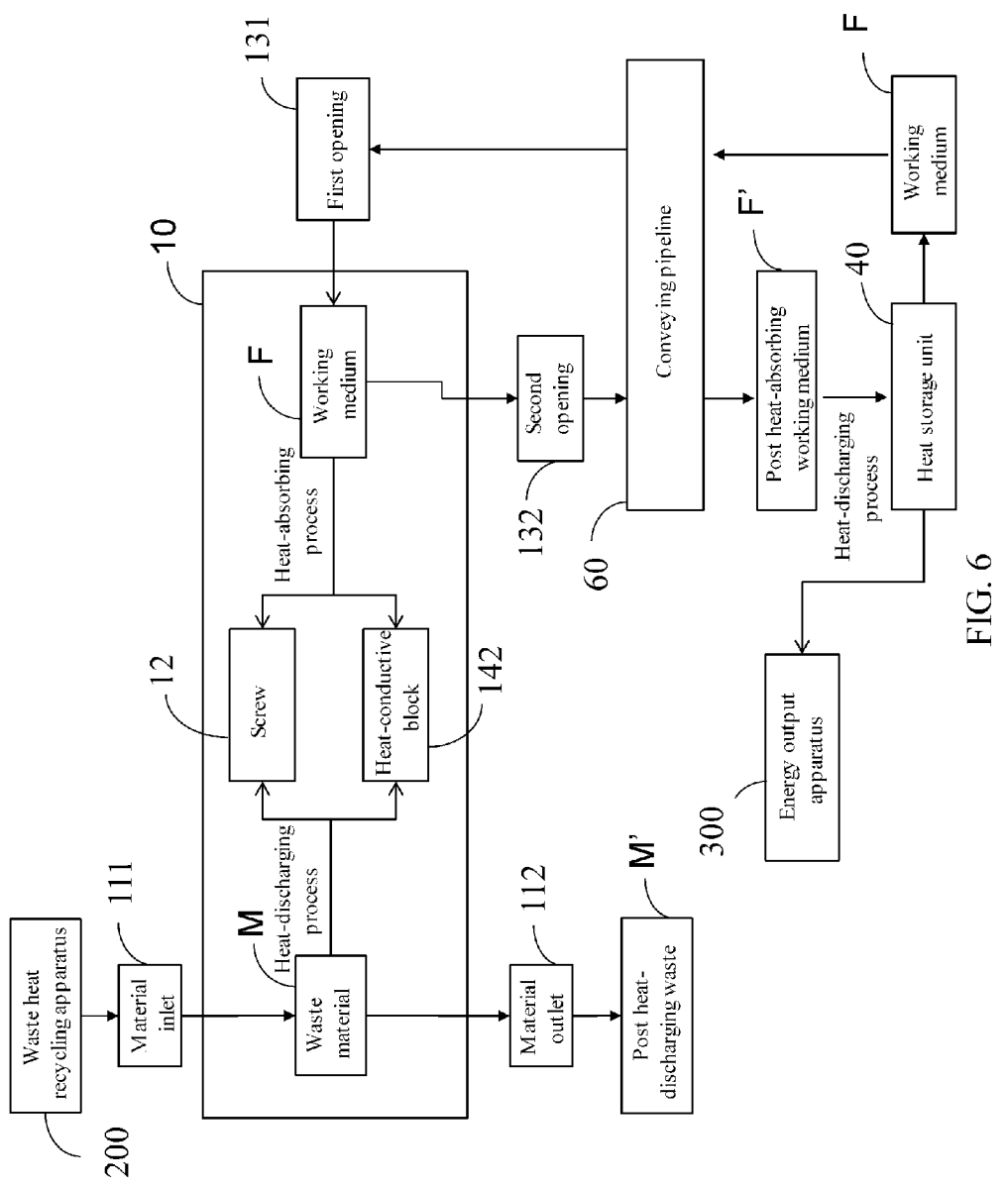
FIG. 6 illustrates an operation flow of an embodiment of the waste heat recovery apparatus in accordance with the present invention.

Referring to FIG. 5, FIG. 6 and also FIG. 1, they illustrate details of a waste material being applied to one embodiment of the heat recovery apparatus 100 in accordance with the present invention. As shown, a waste processing apparatus 200 continuously provides a high-temperature waste M to the first material chamber 110 through the material inlet 111. In the first material chamber 110, the high-temperature waste M is extruded toward the material outlet 112 by the rotation of the screw 12. At the same time, a working medium F with a predetermined comparatively low temperature is forced to flow within the conveying pipeline 60 by the compression unit 50. The working medium F enters the second material chamber 130 through the first opening 131, and then flows toward the second opening 132.

In the present invention, the working medium F can be, but is not limited to, a two-phase mixed fluid, a Newtonian fluid, or a non-Newtonian fluid, in which the two-phase mixed fluid can be a gas-liquid mixed fluid.

By extruding the high-temperature waste M from the material inlet 111 to the material outlet 112 as well as driving the comparatively low-temperature working medium F to flow from the first opening 131 to the second opening 132, according to a cylindrical (r, Φ, z) coordinate system, since a temperature difference exists between the high-temperature waste M in the first material chamber 110 and the working medium F in the second material chamber 130, a temperature gradient would exist across the shell wall of the screw shaft 13, and exist across the heat-conductive block 142 and the heat-conductive stud 1421 whereby a thermal conduction is created for transferring the thermal energy from the high-temperature waste M to the second material chamber 130 thereby causing a temperature drop of the waste M. The thermal energy is then absorbed by the low-temperature working medium F in the second material chamber 130 so that the temperature of the working medium F adjacent the shell wall of the screw shaft 13 is risen thereby generating another temperature gradient between the working medium F adjacent the shell wall of the screw shaft 13 and the working medium F in the central portion of the screw shaft 13 and inducing thermal convection inside the screw shaft 13. Since the high-temperature waste M and the working medium F are both continuously flowing fluids, in addition to the aforesaid thermal conduction and thermal convection, a forced thermal convection can also be occurred along the Z axis (namely, along the piping) between the high-temperature waste M and the working medium F.

In the present invention, the heat exchange is continuously proceeded during the heat-discharging process upon the high-temperature waste M and the heat-absorbing process upon the working medium F. The heat-discharging waste material M' is then exhausted exteriorly of the hollow tubular structure 11 through the material outlet 112, while the post heat-absorbing working medium F' in the central pipe would flow out of the second opening 132, and then enter the heat storage unit 40 via the first connection channel 41 through the conveying pipeline 60 connected with the second opening 132 and the first connection channel 41.

After the heat-absorbing process, the comparatively high-temperature working medium F' performs another heat exchange process with the comparatively low-temperature thermal-storage medium in the heat storage unit 40. In this process, the heat-absorbing working medium F' flowing into the heat storage unit 40 would discharge the thermal energy such that a temperature drop of the working medium F' is occurred. In the mean time, the thermal-storage medium would absorb the thermal energy thereby rising the temperature thereof. The heat exchange process between the working medium F' and the thermal-storage medium won't stop until a thermal equilibrium is occurred therebetween. After the heat exchange process in the heat storage unit 40, the heat-absorbing working medium F' would return to the state of the working medium F with the predetermined comparatively low-temperature temperature, flow out of the second connection channel 42, and then enter the heat exchange unit 10 from the first opening 131 through the conveying pipeline 60. The thermal energy absorbed by the heat storage unit 40 can be transferred to the energy output apparatus 300 which directly outputs the thermal energy for usage or converts the thermal energy into another form of energy.

In this embodiment, by appropriately controlling the flow rate of the high-temperature waste M and the working medium F, arranging the number, materials and dimensions of the heat-conductive studs 1421, and increasing the diameter and length, as well as reducing the thickness of the shell wall of the screw shaft 13, a temperature equilibrium can be substantially achieved between the high-temperature waste M and the working medium F whereby the heat-absorbing working medium F' flowing along the central pipe can have a temperature rise range more than 100° C. at the second opening 132, which is close to the temperature of the high-temperature waste M at the material inlet 111. It is noted that the higher the temperature of the heat-absorbing working medium F' in the heat storage unit 40, the higher energy conversion efficiency during the heat exchange process occurred. Nevertheless, since the screw 12 sustained a torque when rotating to extrude the high-temperature waste M, a design limitation in wall thickness of the screw shaft 13 will be incurred so that the mass capacity of the working medium F inside the second material chamber 130 for heat-exchange with the high-temperature waste M will be limited as well. Consequently, even if the working medium F' can absorb the heat from the waste M thereby becoming a high-temperature fluid in the central pipe, the high-temperature waste M that incompletely discharge the thermal energy during the heat exchange process may be exhausted thereby reducing the heat recovery efficiency of the waste material M in this heat recovery apparatus 100.

Figure 7:
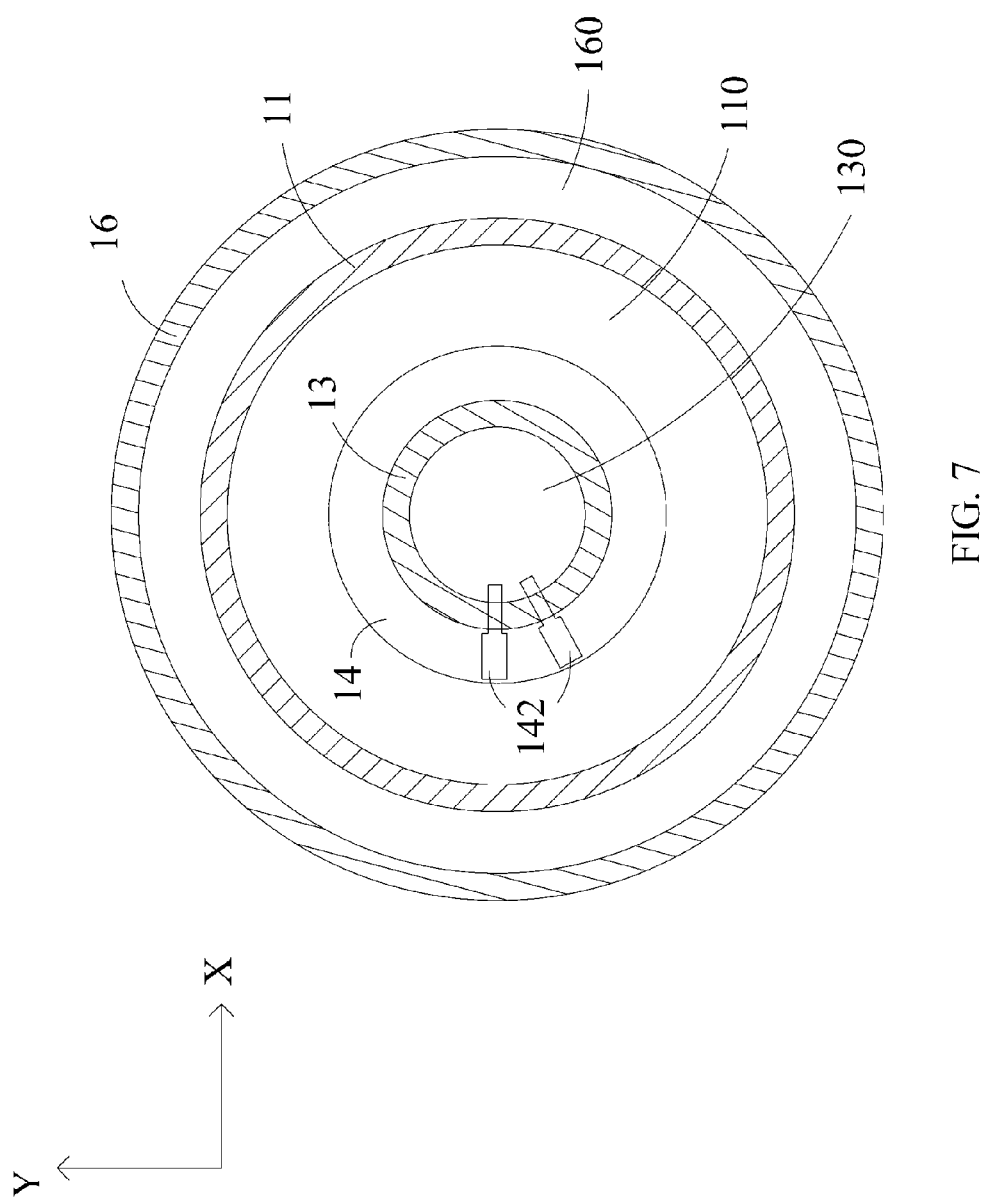
FIG. 7 is a schematic cross-sectional view of a portion of another embodiment of the heat exchange unit in accordance with the present invention.
Figure 8:
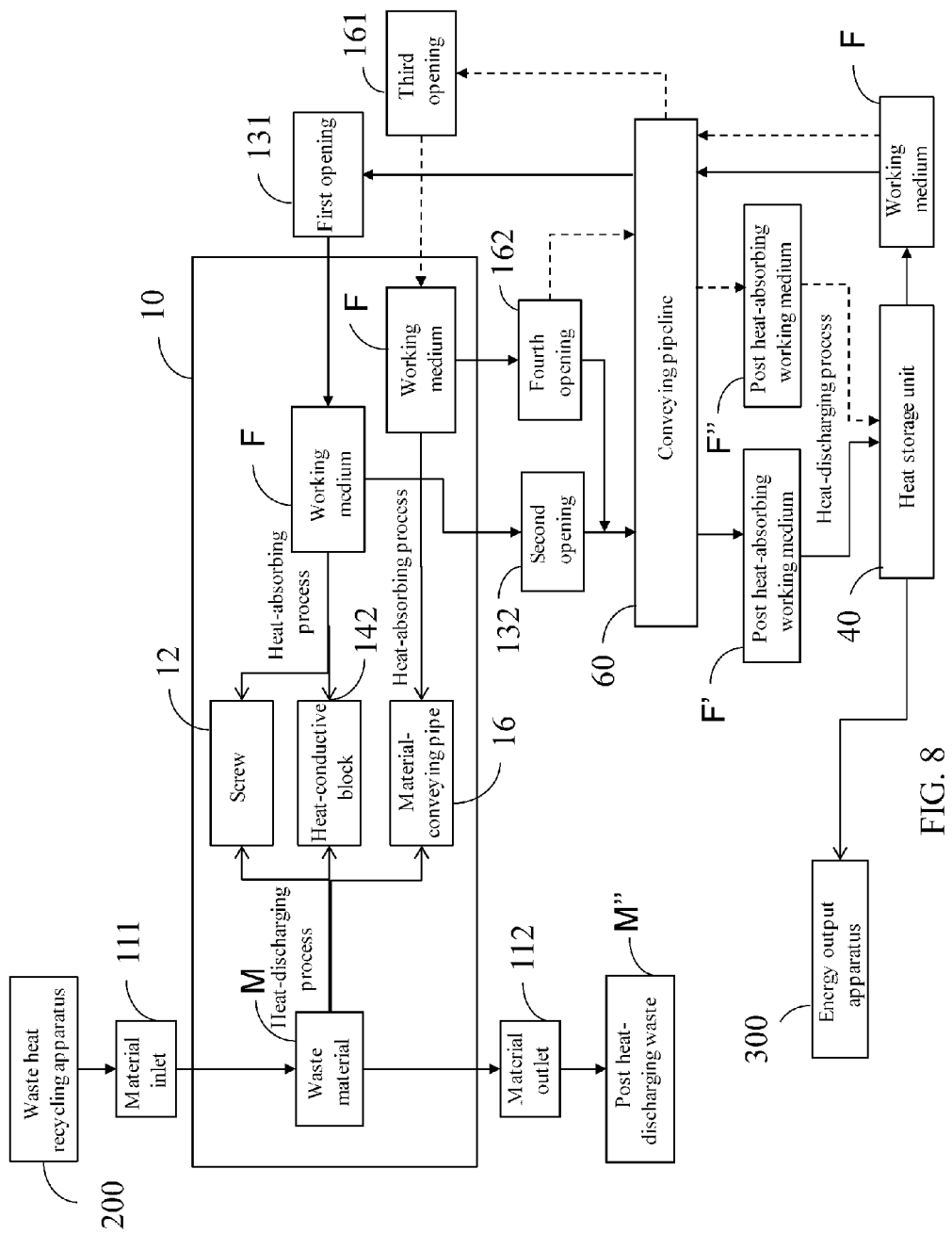
FIG. 8 illustrates an operation flow of another embodiment of the waste heat recovery apparatus in accordance with the present invention.

Referring now to FIG. 7 and FIG. 8, another embodiment of the present invention is demonstrated. By comparing with the aforesaid embodiment shown in FIG. 5 and FIG. 6, the major improvement in this embodiment is to add a material-conveying pipe 16 to sleeve the hollow tubular structure 11. In case of the present embodiment, instead of wrapping around the hollow tubular structure 11, the heat-insulation cover 15 is wrapped around the material-conveying pipe 16. In the following description upon this embodiment, the like numbers and terms referred to the same elements described in the aforesaid embodiment, and explanation is provided about the difference therebetween.

In this embodiment, the material-conveying pipe 16 formed as a hollow pipe with two opposing opening ends extended over the corresponding ends of the hollow tubular structure 11 is axially arranged to enclose the hollow tubular structure 11. A third opening 161 and a fourth opening 162 are mounted to the two opposing opening ends of the material-conveying pipe 16, respectively. As shown in FIG. 7, a third material chamber 160 is formed between the material-conveying pipe 16 and the hollow tubular structure 11. The third material chamber 160 is communicated with the third opening 161 and the fourth opening 162.

In this embodiment, the conveying pipeline 60 further comprises two branch pipes arranged at specific sections to connect with the third opening 161 and the fourth opening 162, respectively. The third opening 161 is communicated with the first opening 131, while the fourth opening 162 is communicated with the second opening 132. Similar to the aforesaid embodiment, the conveying pipeline 60 also provides two terminals to connect the first connection channel 41 and the second connection channel 42, respectively. Alternatively, in addition to two branch pipes, two separated pipelines 60 are adapted such that the third opening 161 is not communicated with the first opening 131, and the fourth opening 162 is not communicated with the second opening 132. In this embodiment, two ends of one pipe section of one pipeline 60 are respectively connected with the first opening 131 and the first connection channel 41 while two ends of the other pipe section of the same pipeline 60 are respectively connected with the second opening 132 and the second connection channel 42, and two ends of one pipe section of the other pipeline 60 are respectively communicated with the third opening 161 and the first connection channel 41 while two ends of the other pipe section of the same pipeline 60 are respectively connected with the fourth opening 162 and the second connection channel 42. It is noted that the design of the pipeline 60 can be varied and optimized according to the actual need, which will not be limited by the aforesaid embodiments.

In this embodiment, the first material chamber 110 defined between the hollow tubular structure 11 and the screw 12 is communicated with the material inlet 111 and the material outlet 112. The material for the material-conveying pipe 16 can be, but is not limited to, one of SUS304 stainless steel, SUS310 stainless steel, SUS316 stainless steel and Inconel.

In this embodiment, the dimensions and the wall thickness of the material-conveying pipe 16 have no specific limitation and can be optimized according to the practical requirement.

Referring to FIG. 7, FIG. 8 and also FIG. 1, the waste processing apparatus 200 continuously provides the high-temperature waste M to the first material chamber 110 through the material inlet 111. In the first material chamber 110, the high-temperature waste M is extruded toward the material outlet 112 by a rotation of the screw 12. In the mean time, a working medium F with a predetermined comparatively low temperature is forced to flow within the conveying pipeline 60 by the compression unit 50. The working medium F enters the second material chamber 130 through the first opening 131 and concurrently enters the third material chamber 160 through the third opening 161, and then exits from the second opening 132 and the fourth opening 162, respectively.

In this embodiment, except for the heat exchange process described in the aforesaid embodiment, the working medium F with a predetermined comparatively low temperature in the third material chamber 160 can also perform another heat exchange process including thermal conduction and thermal convection with the high-temperature waste M in the first material chamber 110. After the heat exchange process, the heat-discharging waste material M' is exhausted exteriorly of the first material chamber 110 through the material outlet 112, whereas the working mediums F'/F" in the second material chamber 130 and the third material chamber 160 flow into the heat storage unit 40. In particular, the heat-absorbing working medium F' in the third material chamber 160 flows into the pipeline 60 via the fourth opening 162 thereby mixing with the heat-absorbing working medium F' exiting from the second material chamber 130. The mixed working medium enters the heat storage unit 40 via the first connection channel 41. Thereafter, the heat storage unit 40 of this embodiment performs the same heat exchange process described in the aforesaid embodiment. Then, the heat-discharging working medium F returns to the heat exchange unit 10 via the first opening 131, as the solid-line path shown in FIG. 8.

Alternatively, the heat-absorbing working medium F" in the third material chamber 160 can be sent to the heat storage unit 40 through a separate pipeline without mixing with the heat-absorbing working medium F' exiting from the second material chamber 130, i.e., two separate pipelines utilized to guide the working mediums F" and F' to the heat storage unit 40. In this embodiment, the heat-absorbing working medium F" exiting from the second opening 162 flows into the separate pipeline directly, and enters the heat storage unit 40 through another first connection channel. Thereafter, the heat storage unit 40 of this embodiment performs the same heat exchange process described in the aforesaid embodiment. Then, the heat-discharging working medium F returns to the heat exchange unit 10 by another separate pipeline coupled to the third opening 161 and the second connection channel 42, as the dashed-line path shown in FIG. 8.

In this embodiment, for the material-conveying pipe 16 needn't to bear the same torque as the screw shaft 13 does, the determination on the shell thickness can be more flexible. By increasing the mass flow of the working medium F inside the heat exchange unit 10, the heat contained within the high-temperature waste M can be completely dissipated during the heat exchange process. Namely, by having both the heat-absorbing working medium F' in the second material chamber 130 and the heat-absorbing working medium F" in the third material chamber 160 to perform heat exchange with the waste M, the heat recovery efficiency of the waste material by the heat recovery apparatus 100 can be substantially improved.

Figure 9A:
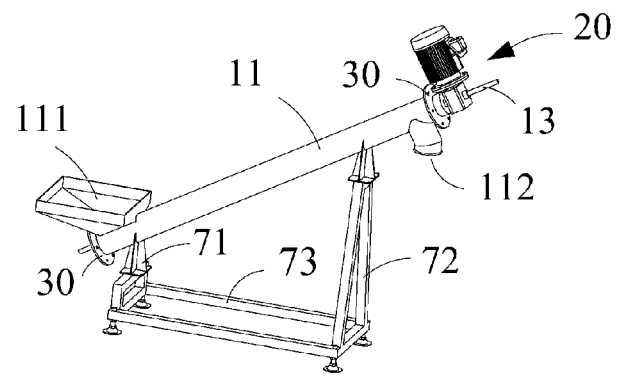
FIG. 9A is a schematic perspective view of an embodiment of the waste processing module in accordance with the present invention.
Figure 9B:
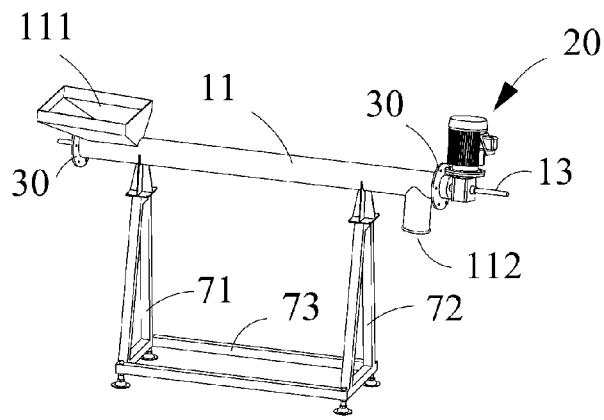
FIG. 9B is a schematic perspective view of another embodiment of the waste processing module in accordance with the present invention.
Figure 9C:
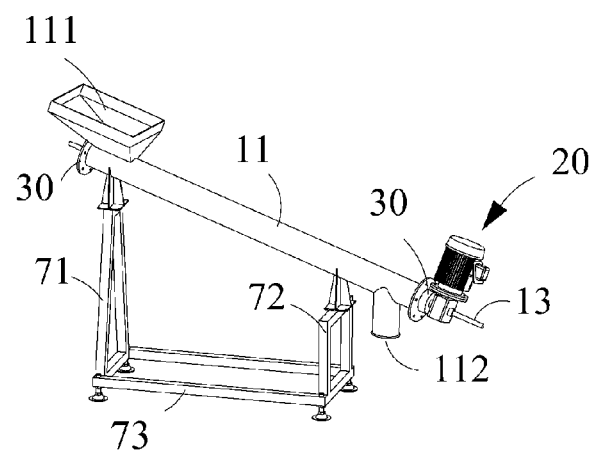
FIG. 9C is a schematic perspective view of a further embodiment of the waste processing module in accordance with the present invention.

Referring now to FIG. 9A, FIG. 9B and FIG. 9C, three embodiments for height adjustment are shown, respectively. As shown, the waste processing module 101 can have different inclinations by adjusting the height combination of the first support member 71 and the second support member 72 in response to various heights that the waste processing apparatus 200 is located to supply the high-temperature waste M, whereby the flexible operation buffer for distributing mass flow rate of the high-temperature waste M and the working medium F can be obtained to adjust the flow speed as well as the potential difference of the high-temperature waste M and the working medium F inside the heat exchange unit 10 such that a better heat exchange efficiency can be achieved.

Figure 10A:
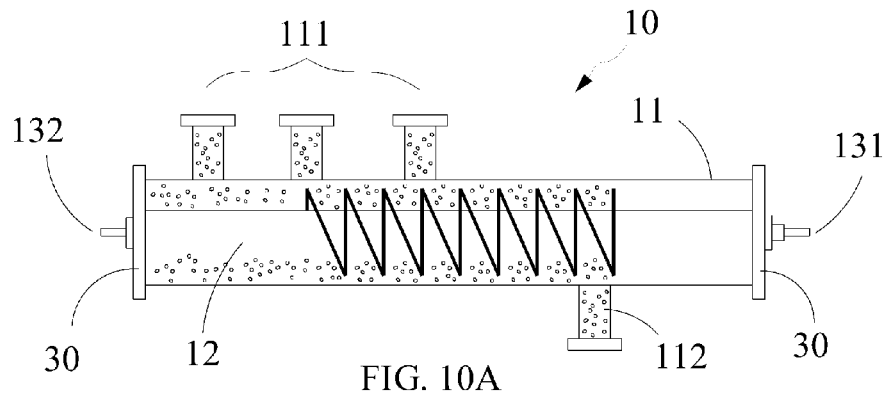
FIG. 10A is a schematic view of an embodiment of the heat exchange unit in accordance with the present invention.
Figure 10B:
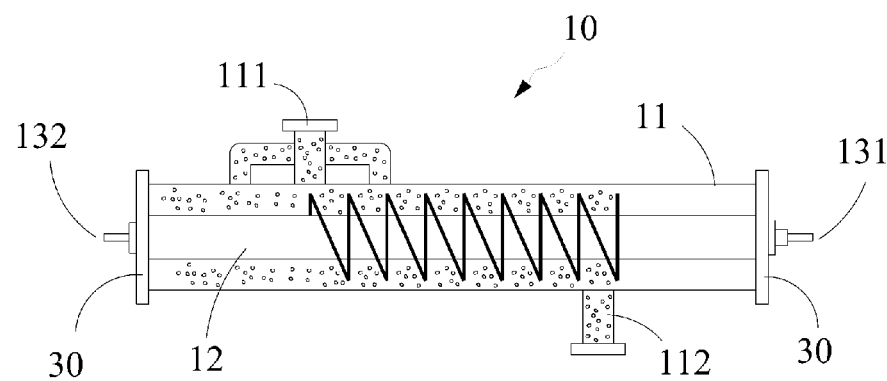
FIG. 10B is a schematic view of another embodiment of the heat exchange unit in accordance with the present invention.
Figure 10C:
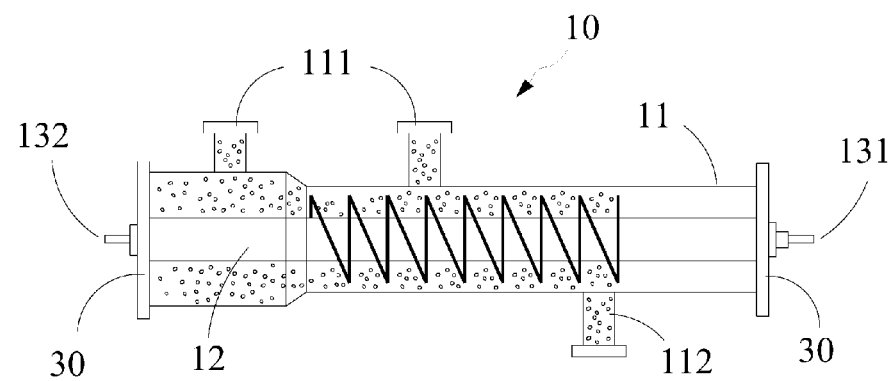
FIG. 10C is a schematic view of a further embodiment of the heat exchange unit in accordance with the present invention.

Referring now to FIG. 10A, FIG. 10B and FIG. 10C, three embodiment of the material inlet 111 are shown, respectively. As shown in FIG. 10A, three material inlets 111 are arranged at three different locations. As shown in FIG. 10B, the material inlet 111 is bifurcated into a plurality of sub-pipes (e.g., three shown in the figure) so as to distribute the incoming waste M purposely into various locations of the hollow tubular structure 11. As shown in FIG. 10C, by assembling a plurality of tubular structures respectively having different cross-sectional area to form the hollow tubular structure 11, more internal space in the hollow tubular structure 11 can be obtained for accommodating the high-temperature waste M. All these varied embodiments are designed to maintain the high-temperature state inside the hollow tubular structure 11, and to ensure the thermal energy discharged from the waste M to be effectively absorbed by the working medium F thereby increasing the temperature of the working medium F at the second opening. Hence, the overall heat recovery efficiency can be substantially enhanced.

In the present invention, various embodiments described above can be combined or applied individually per practical requirements.

Figure 11:
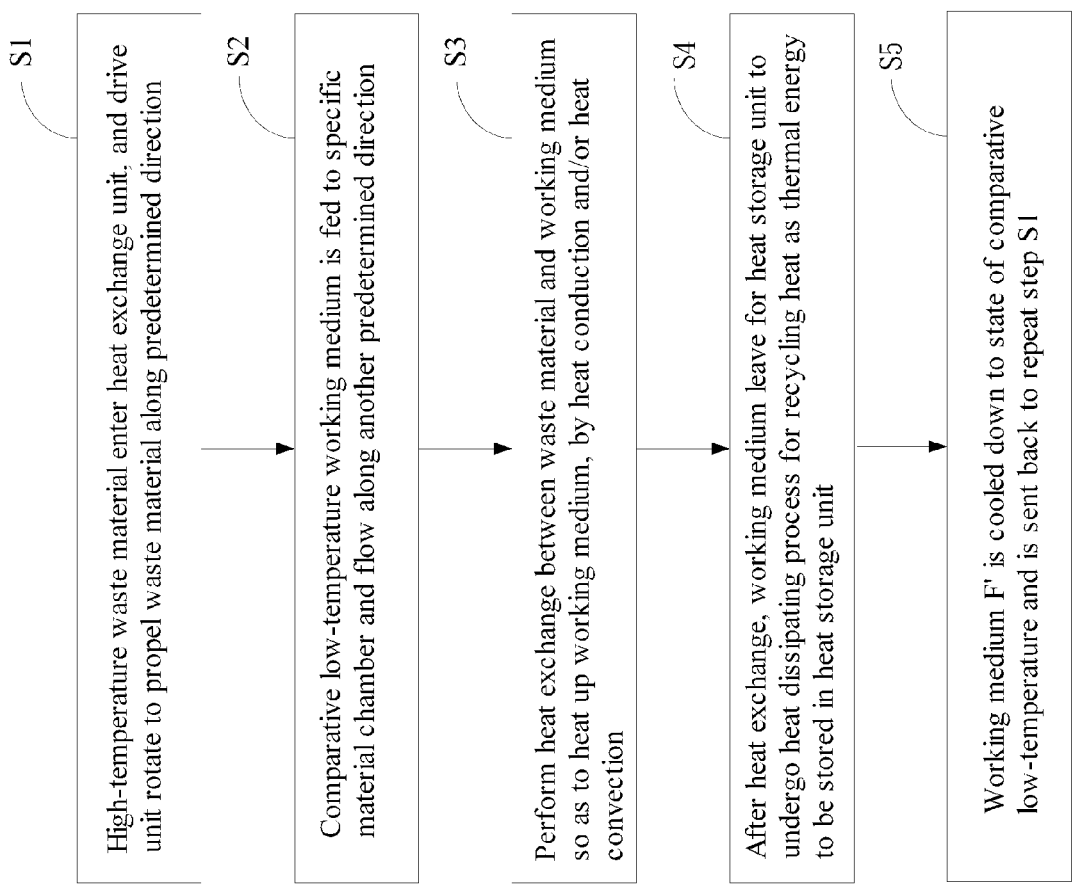
FIG. 11 is a flowchart illustrating steps of method for recycling the waste heat in accordance with the present invention.

Referring now to FIG. 11, a waste heat recovery method in accordance with the present invention includes the following steps.

S1: As shown in FIG. 5, a high-temperature waste material M is introduced into the first material chamber 110 from the material inlet 111 of the hollow tubular structure 11. The temperature of the waste material M is more than 300° C. In one embodiment, the waste material M can be, but is not limited to, 500° C. The drive unit 20 rotates the screw 12 to extrude the waste material M forward along a moving direction from the material inlet 111 to the material outlet 112.

S2: A comparatively low-temperature working medium F circulated by the compression unit 50 flows into the second material chamber 130 inside the screw shaft 13 from the first opening 131 of the hollow screw shaft 13, wherein a moving direction of the high-temperature waste material M inside the hollow tubular structure 11 and a moving direction of the working medium F in the hollow tubular structure 11 are either co-flow or counter-flow by 180 degree.

Refer to the waste processing module 101 shown in FIG. 7, wherein, in this alternative embodiment, the working medium F is circulated by the compression unit 50, whereby the working medium F can flow into the second material chamber 130 inside the screw shaft 13 and the third material chamber 160 through the same first opening 131 thereof.

In the present invention, the working medium F can be a two-phase mixed fluid, a Newtonian fluid, or a non-Newtonian fluid, in which the two-phase mixed fluid can be a gas-liquid mixed fluid.

S3: Refer to FIG. 5, in which a heat exchange process is performed between the flowing waste material M and the working medium F flowing inside the screw shaft 13. Further, after the heat exchange process, a temperature equilibrium state is achieved between the heat-discharging waste material M' and the heat-absorbing working medium F' inside the second material chamber 130. Nevertheless, the thermal state between the heat-discharging waste material M' and the heat-absorbing working medium F' inside the second material chamber 130 can be, but is not limited to, a state of equilibrium temperatures or a state of quasi-equilibrium temperature, or any thermal state such that the temperature of the post heat-absorbing working medium F' inside the second material chamber 130 is risen to a specific temperature.

Refer to the waste processing module 101 shown in FIG. 7. The heat exchange process is performed respectively between the flowing waste material M' and the working medium F' flowing into the second material chamber 130, and between the flowing waste material M' and the working medium F''' flowing into the third material chamber 160, wherein a moving direction of the high-temperature waste material M inside the hollow tubular structure 11 and a moving direction of the working medium F' in the second material chamber 130 and/or F''' in the third material chamber 160 are either co-flow or counter-flow by 180 degree. Further, after the heat exchange process, the thermal state between the waste material M' and the heat-absorbing working medium F' inside the second material chamber 130 or the heat-absorbing working medium F''' inside the third material chamber 160 can be, is but not limited to, a state of equilibrium temperatures or a state of quasi-equilibrium temperature, or any thermal state such that the temperature of the heat-absorbing working medium F'/F''' inside the second material chamber 130 and third material chamber 160 is risen to a specific temperature.

In the present invention, the aforesaid specific temperature can be either a constant or a varied temperature, which is determined according to practical needs.

Further, in the aforesaid heat exchange process, the waste material M' undergoes the heat-discharging process, while the working medium F'/F''' undergoes the heat-absorbing process. Also, the heat transfer in the heat exchange process can be thermal conduction and/or thermal convection.

S4: As shown in FIG. 5, after the heat exchange process, the working medium F' leaves the second material chamber 130 and enters the heat storage unit 40 via the opening 132. In the heat storage unit 40, the working medium F' undergoes another heat exchange process to discharge the thermal energy that can be stored by the storage unit 40. The thermal energy can be then directly utilized or transferred to an energy output apparatus 300 coupled with the heat storage unit 40.

The heat-absorbing working medium F' is cool down to become the working medium F again after the heat discharging process in the heat storage unit 40. The working medium F thus flows into the first opening 131 for repeating the aforesaid step S1.

Refer to the waste processing module 101 shown in FIG. 7, after the heat exchange process, the heat-absorbing working medium F' in the second material chamber 130 exits from the second opening 132 and the heat-absorbing working medium F''' in the third material chamber 160 exits from the fourth opening 162 and commonly enter heat storage 40 through a common pipe or separate pipes. In the heat storage unit 40, the heat-absorbing working medium F' from the second material chamber 130, or the mixed flow of the heat-absorbing working medium F' from the second material chamber 130 and the heat-absorbing working medium F''' from the third material chamber 160 undergoes another heat exchange process so as to dissipate the thermal energy that can be absorbed and stored by the heat storage unit 40.

Further, the heat transfer in the aforesaid heat exchange processes in steps S3 and S4 can be thermal conduction and/or thermal convection process. The thermal energy stored in the heat storage unit 40 can be transferred to an energy output apparatus 300, via thermal conduction and/or thermal convection. The energy output apparatus 300 can be a hot water supply apparatus, a generator, a warm-air providing apparatus, a steam generator, a burning apparatus, or any the like.

S5: As shown in FIG. 5, after the heat discharging or dissipating process, the working medium F' returns the state of the comparatively low-temperature working medium F, and then is circulated by the compression unit 50 to enter the heat exchange unit 10 for starting over the heat exchange journey beginning at step S1.

As shown in FIG. 7, after the heat discharging or dissipating process, both the working medium F' exiting from the second material chamber 130 and the working medium F''' exiting from the third material chamber 160 return to the state of the comparatively low-temperature working medium F, and is circulated by the compression unit 50 to enter the heat exchange unit 10 via the pipeline 60 coupled to the first opening 131, the third opening 161 and second connection channel 42 for starting over the heat exchange journey beginning at step S1.

As described above, by providing the waste heat recovery apparatus 100 and the corresponding recycling method, the thermal energy contained within the high-temperature waste M can be recovered by a heat exchange process between the comparatively low-temperature working medium F and the high-temperature waste M during the transportation of the waste M. The heat-absorbing working medium F' flows into the heat storage unit 40 and discharges thermal energy which is further stored in the heat storage unit 40. Thereby, the thermal energy stored in the heat storage unit 40 can then be recovered for further direct utilization or conversion into any proper energy form, so that the efficiency of energy utilization can be substantially improved.

While the present invention has been particularly shown and described with reference to a preferred embodiment, it will be understood by those skilled in the art that various changes in form and detail may be without departing from the spirit and scope of the present invention.

What is claimed is:

1. A waste heat recovery apparatus, comprising:
   a waste processing module, comprising:
   a heat exchange unit, further comprising:
   a hollow tubular structure configured to have two opposing open ends and a first material chamber formed therein;
   at least one material inlet located exteriorly on a first end of the hollow tubular structure and communicated with the first material chamber of the hollow tubular structure for supplying a waste material to the hollow tubular structure;
   at least one material outlet located exteriorly on a second end of the hollow tubular structure and communicated with the first material chamber of the hollow tubular structure for allowing the waste material to leave the hollow tubular structure;
   at least one screw, mounted axially inside the hollow tubular structure with two opposing ends extending out of the hollow tubular structure, each screw comprising:
   a hollow screw shaft configured to have both opposing ends extending out of the hollow tubular structure, a first opening and a second opening being located respectively at the corresponding opposing ends, and a second material chamber communicated with the first and the second openings for allowing a working medium flowing therethrough; and
   a helical blade, formed externally around the screw shaft with a predetermined pitch, wherein the helical blade further includes:
   a plurality of radial grooves formed on a surface of the helical blade; and
   a plurality of heat-conductive blocks, each of which is located inside one of the grooves, wherein at least one heat-conductive stud is formed at the inner end of the heat-conductive block adjacent to the screw shaft and penetrates through the shaft to fix the heat-conductive block;
   a drive unit, located exteriorly of the hollow tubular structure for rotating the at least one screw to extrude the waste material to move forward; and
   a heat recovery module, located exteriorly of the waste processing module, further comprising:
   a heat storage unit configured to contain thereinside a heat-storing medium for storing thermal energy;
   a first conveying pipeline in communication with the heat exchange unit and the heat storage unit, the first conveying pipeline being divided into a first front section for conveying the working medium from the heat exchange unit to the heat storage unit and a first tail section for conveying the working medium from the heat storage unit back to the heat exchange unit; and
   a compression unit coupled to the first conveying pipeline for driving the working medium to flow within the first conveying pipeline.

2. The waste heat recovery apparatus of claim 1, wherein the waste processing module further including:
   a pipe connector assembly, selectively engaged to respective open ends of the hollow tubular structure for enclosing the hollow tubular structure and supporting the at least one screw;
   an elevation-adjusting assembly configured to include a base, a first support member and a second support member, wherein the lower ends of the first support member and the second support member are selectively coupled to the base, and the upper ends of the first support member and the second support member are coupled with the hollow tubular structure;
   a heat-insulation cover configured to wrap around the hollow tubular structure for preventing the thermal energy from being dissipated to the atmosphere;
   wherein the lengths of the first support member and the second support member can be separately adjusted for changing the relative height and potential difference between the material inlet and outlet.

3. The waste heat recovery apparatus of claim 1, wherein the heat exchange unit further comprises:
   a working medium conveying pipe configured as a hollow pipe with a third opening and a fourth opening for accommodating the hollow tubular structure and have a third material chamber formed therein to communicate with the third opening and the fourth opening;
   wherein the working medium conveying pipe is wrapped by a heat-insulation cover.

4. The waste heat recovery apparatus of claim 3, wherein the hollow tubular structure is shaped as one of a hollow cylindrical pipe, a hollow conical pipe, and a combination of the aforesaid two pipes.

5. The waste heat recovery apparatus of claim 3, wherein the working medium conveying pipe is made of a material selected from the group of an SUS304 stainless steel, an SUS310 stainless steel, an SUS316 stainless steel and an Inconel.

6. The waste heat recovery apparatus of claim 1, wherein a cross section of each groove is selected from a group of a concave shape, a U shape, a V shape and a round shape, a cross-sectional profile of each heat-conductive block is fitted with a cross-sectional profile of the groove, a cross section of each heat-conductive stud is selected from the group of a rectangular shape, a diamond shape, a circle, an oval shape, and an O shape, the heat-conductive block and the heat-conductive stud are made of a material having a high thermal conductivity coefficient, the screw is one of a single-thread screw, a double-thread screw and a multi-thread screw, and the helical blade has a cross section selected from the group of a rectangular cross section and a triangular cross section.

7. The waste heat recovery apparatus of claim 1, wherein the drive unit has a motor and a bearing assembly coupled with the screw shaft and the motor being one of a step motor and a servo motor.

8. The waste heat recovery apparatus of claim 1, wherein the heat recovery module further comprises:
an energy output apparatus coupled with the heat storage unit for receiving the thermal energy transferred from the heat-storing medium inside the heat storage unit by at least one of thermal conduction and thermal convection, and selectively configured to operate in one of outputting the thermal energy directly, or transforming the thermal energy and outputting the transformed thermal energy, wherein the energy output apparatus is selected from the group of a hot water supply apparatus, a generator, a warm-air providing apparatus, a steam generator and a burning apparatus.

9. The waste heat recovery apparatus of claim 8, wherein the heat-storing medium inside the heat storage unit is selected from the group of a steam, a molten salt, a heat-conductive oil, a metallic material and a ceramic material.

10. The waste heat recovery apparatus of claim 1, wherein one end of the first front section of the first conveying pipeline is coupled with the second opening and one end of the first tail section of the first conveying pipeline is coupled with the first opening, wherein the heat storage unit further includes:
a first connection channel configured to have a first channel end connected with the front section and a second channel end connected with the heat storage unit; and
a second connection channel configured to have a third channel end connected with the tail section and a fourth channel end connected with the heat storage unit.

11. The waste heat recovery apparatus of claim 3, further including a second conveying pipeline being divided into a second front section for conveying the working medium from the working medium conveying pipe via a fourth opening of the working medium conveying pipe to the heat storage unit and a second tail section for conveying the working medium from the heat storage unit back to the working medium conveying pipe via a third opening of the working medium conveying pipe, the heat storage unit further including:

a third connection channel configured to have a first channel end connected with the second front section and a second channel end connected with the heat storage unit; and
a fourth connection channel configured to have a third channel end connected with the tail section and a fourth channel end connected with the heat storage unit.

12. A waste heat recovery method for the waste heat recovery apparatus of claim 10, comprising the steps of:
providing a high-temperature waste material to enter the heat exchange unit;
rotating the screw shaft by the drive unit so as to extrude the waste material to move forward along a predetermined direction;
providing the working medium to enter a specific material chamber inside the hollow tubular structure from the first conveying pipeline;
forcing the working medium to move forward along another predetermined direction by the compression unit;
performing a first heat exchange process between the waste material and the working medium, whereby the working medium absorbs heat and is heated up to a specific temperature, wherein the heat exchange process includes thermal conduction and thermal convection;
enabling the working medium to leave the specific material chamber of the heat exchange unit after the heat exchange process and to enter the heat storage unit via a specific route of the first conveying pipeline;
performing a second heat exchange process between the working medium and the heat storage unit such that the heat storage unit absorbs the thermal energy for storage and/or for output and the working medium encounters a temperature drop; and
conveying the working medium back to the specific material chamber via the specific route after the second heat exchange process in the heat storage unit.

13. A waste heat recovery method for the waste heat recovery apparatus of claim 11, comprising the steps of:
providing a high-temperature waste material to enter the heat exchange unit;
rotating the screw shaft by the drive unit so as to extrude the waste material to move forward along a predetermined direction;
providing the working medium to enter a specific material chamber inside the hollow tubular structure from the first conveying pipeline;
forcing the working medium to move forward along another predetermined direction by the compression unit;
performing a first heat exchange process between the waste material and the working medium in the specific material chambers, whereby the working medium absorbs heat and is heated up to a specific temperature, wherein the heat exchange process includes thermal conduction and thermal convection;
enabling the working medium to leave the specific material chambers of the heat exchange unit after the heat exchange process and enter the heat storage unit via a specific route of the first and second conveying pipelines;
performing a second heat exchange process between the working medium and the heat storage unit such that the heat storage unit absorbs the thermal energy for storage and/or for output and the working medium encounters a temperature drop; and conveying the working medium back to the specific material chamber via the specific route after the second heat exchange process in the heat storage unit.

14. The waste heat recovery method of claim 12, wherein, after the first heat exchange process,
the specific temperature of the working medium inside the hollow tubular structure is a temperature at a state selected from one of the state of equilibrium temperatures or a state of quasi-equilibrium temperature;
the working medium is one of a two-phase mixed fluid, a Newtonian fluid, or a non-Newtonian fluid, wherein the two-phase mixed fluid is a gas-liquid mixed fluid;
the waste material enters the hollow tubular structure via the material inlet;
the drive unit utilizes a motor to rotate the screw to extrude the waste material to move forward and to leave the hollow tubular structure via the material outlet;
a moving direction of the high-temperature waste material inside the hollow tubular structure and a moving direction of the working medium in the hollow tubular structure are either co-flow or counter-flow by 180 degree;
the specific chamber in which the working medium flows is the second material chamber;
the specific route of the working medium is the route that the working medium enters and then leaves the heat storage unit via the first conveying pipeline; and
the heat storage unit is coupled to an energy output apparatus and transfers the stored thermal energy to the energy output apparatus which outputs the thermal energy directly or converts the thermal energy into different type of energy.

15. The waste heat recovery method of claim 13, wherein, after the heat exchange process,
the specific temperature of the working medium inside the hollow tubular structure is a temperature at a state selected from one of the state of equilibrium temperatures or a state of quasi-equilibrium temperature;
the working medium is one of a two-phase mixed fluid, a Newtonian fluid, or a non-Newtonian fluid, wherein the two-phase mixed fluid is a gas-liquid mixed fluid;
the waste material enters the hollow tubular structure via the material inlet;
the drive unit utilizes a motor to rotate the screw to propel the waste material to move forward and to leave the hollow tubular structure via the material outlet;
a moving direction of the high-temperature waste material inside the hollow tubular structure and a moving direction of the working medium in the hollow tubular structure are either co-flow or counter-flow by 180 degree;
the specific chamber in which the working medium flows is at least one of the second material chamber or the third material chamber;
the specific route of the working medium is the route that the working medium enters and then to leaves the heat storage unit via the first conveying pipelines or via the first and second conveying pipelines; and
the heat storage unit is coupled to an energy output apparatus and transfers the stored thermal energy to the energy output apparatus which outputs the thermal energy directly or converts the thermal energy into different type of energy.

* * * * *